US009852425B2

(12) United States Patent
Phillips (10) Patent No.: US 9,852,425 B2
(45) Date of Patent: Dec. 26, 2017

(54) DUAL/MULTIPLE PIN PAYMENT ACCOUNT

(71) Applicant: MasterCard International Incorporated, Purchase, NY (US)

(72) Inventor: Simon Phillips, York (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 669 days.

(21) Appl. No.: 14/196,646

(22) Filed: Mar. 4, 2014

(65) Prior Publication Data

US 2014/0250018 A1 Sep. 4, 2014

(30) Foreign Application Priority Data

Mar. 4, 2013 (GB) .................................. 1303812.0

(51) Int. Cl.
*G06Q 20/40* (2012.01)
(52) U.S. Cl.
CPC ....... *G06Q 20/4012* (2013.01); *G06Q 20/405* (2013.01)
(58) Field of Classification Search
USPC .............................. 235/379; 705/16, 26.1, 44
See application file for complete search history.

(56) References Cited

U.S. PATENT DOCUMENTS

| 5,668,876 | A | 9/1997 | Falk et al. |
| 5,914,472 | A | 6/1999 | Foladare et al. |
| 8,127,982 | B1 * | 3/2012 | Casey ............. G06Q 20/35785 235/379 |
| 8,132,016 | B1 | 3/2012 | Stewart et al. |
| 2005/0274796 | A1 | 12/2005 | Miyashita |
| 2006/0074798 | A1 * | 4/2006 | Din ........................ G06Q 20/02 705/39 |
| 2006/0288405 | A1 | 12/2006 | Albisu et al. |
| 2007/0088952 | A1 | 4/2007 | Hewitt et al. |
| 2007/0203850 | A1 | 8/2007 | Singh et al. |
| 2008/0228615 | A1 * | 9/2008 | Scipioni ................. G06Q 20/04 705/35 |

(Continued)

FOREIGN PATENT DOCUMENTS

| DE | 102 18 210 A1 | 11/2003 |
| EP | 1 612 712 A1 | 1/2006 |

(Continued)

OTHER PUBLICATIONS

Search Report dated Aug. 27, 2014, by the Intellectual Property Office of Great Britain in corresponding British Patent Application No. GB1403818.6. (3 pages).

(Continued)

*Primary Examiner* — Allyson Trail
(74) *Attorney, Agent, or Firm* — Buchanan Ingersoll & Rooney PC (57) ABSTRACT

The present invention relates to a method of authorizing a transaction process, whereby a communication between a payment device and a payment processing network is established. Subsequently a transaction is initialized at the payment device, the input of a first User Identification Metric (UIM) is requested, the input of a second UIM is requested, the first and second UIMs are verified and the transaction process proceeds if both UIMs are verified.

28 Claims, 5 Drawing Sheets

(56) References Cited

U.S. PATENT DOCUMENTS

| | | | | |
|---|---|---|---|---|
| 2010/0312703 A1* | 12/2010 | Kulpati | ................... | G06Q 20/32 |
| | | | | 705/44 |
| 2011/0093351 A1* | 4/2011 | Afana | ..................... | G06Q 20/20 |
| | | | | 705/16 |
| 2011/0213711 A1 | 9/2011 | Skinner et al. | | |
| 2012/0284526 A1 | 11/2012 | Arnold et al. | | |
| 2012/0323717 A1* | 12/2012 | Kirsch | ............... | G06Q 20/0855 |
| | | | | 705/26.1 |
| 2013/0046645 A1* | 2/2013 | Grigg | .................... | G06Q 30/06 |
| | | | | 705/26.1 |
| 2013/0097080 A1* | 4/2013 | Smets | ....................... | G06T 1/20 |
| | | | | 705/44 |
| 2014/0250018 A1* | 9/2014 | Phillips | .............. | G06Q 20/4012 |
| | | | | 705/72 |

FOREIGN PATENT DOCUMENTS

| | | |
|---|---|---|
| EP | 2 538 364 A1 | 12/2012 |
| WO | 2009/058633 A1 | 5/2009 |

OTHER PUBLICATIONS

Search Report dated Aug. 22, 2013, by the British Patent Office for Application No. 1303812.0.

\* cited by examiner

DUAL/MULTIPLE PIN PAYMENT ACCOUNT

FIELD OF THE INVENTION

The present invention relates generally to a transaction processing system for controlling the transfer of funds to or from an account. More particularly, but not exclusively, it relates to a transaction processing system for controlling the transfer of funds to or from an account which has an associated User Identification Metric (UIM) which enables the account holder to securely provide a second person with access to the account.

BACKGROUND TO THE INVENTION

Many situations arise both in commercial and domestic environments where an account holder requires or desires a second person to make a payment on their behalf or simply to have the ability to make payments from their account whilst at the same time maintaining control over the payments which the second person makes. Examples where such a provision of access may be desired include where the account holder is an employer wishing to allow an employee to make payments using a company account, and where the account holder is a person wishing to allow a dependent to make payments using their account. Many more scenarios exist where such a need arises.

Some account providers currently offer a service which enables an account holder to delegate access to their bank account to a second person giving the second person the right to operate their account. However, such services tend to be aimed at individuals who, for whatever reason, are unable to manage their own accounts as such a delegation gives the second person unrestricted access and therefore the account holder must trust the second person not to abuse their position.

It is possible for an account holder to provide a second person with limited access to their account by using a restricted bank account. Restricted accounts enable a person or company opening the account to place predetermined restrictions on that account. Such accounts can have limitations on payment amounts, who can make those payments, how much can be withdrawn from the account, how often withdrawals can be made and when they can be made. However, these accounts do not allow the account holder any control beyond the predetermination of these restrictions.

Company accounts exist which allow authorised individuals to undertake transactions, etc., but the company has no direct control over such transactions made by the individual. Better control would be beneficial, for example, if users were able to carry out transactions up to a specified limit, but required enhanced authorisation to exceed that limit.

Accordingly, it is desirable to provide account holders with a means for allowing a second person to have access to their account whilst being able to monitor, restrict and impose controls on the second person's use of that account if necessary.

SUMMARY OF THE INVENTION

According to a first aspect of the present invention, there is provided a method of authorising a transaction process, said method comprising the steps of: establishing a communication between a payment device and a payment processing network; initialising a transaction at the payment device; requesting input of a first User Identification Metric (UIM); requesting input of a second UIM; verifying the first UIM; verifying the second UIM; and proceeding with the transaction process if both UIMs are verified.

An account holder is therefore able to allow a second person to have access to their account whilst being able to monitor, restrict and impose controls on the second person's use of that account by simply providing them with one of the UIMs (for example, by providing them with a PIN or registering their biometric information as a UIM) and, if necessary, a payment device. The account holder could delegate both UIMs. For example, one UIM could be provided to an employee and the other to their line manager.

The first UIM may be a Personal Identification Number (PIN) and/or a predetermined biometric identification.

The second UIM may be a PIN and/or a predetermined biometric identification.

At least one of the first and second UIMs may be input directly to the payment device. This alternative takes into account different types of payment devices, including payment devices having their own user interfaces, such as mobile phones or display cards having keypads.

At least one of the first and second UIMs may be input remotely of the payment device and communicated to the payment device. This would enable the first and second UIMs to be input at separate locations, thereby not requiring the different holders of the UIMs to be in the same place.

The step of requesting the first UIM may be executed according to a set of rules, such that the first UIM is only required to be input under certain circumstances. One exemplary rule is that the first UIM is only required to be input if the transaction is for an amount above a first predetermined threshold. Such a rule would enable compatibility with systems such as MasterCard™ PayPass™, an exemplary first threshold being £20.

Likewise, the step of requesting the second UIM may be executed according to a set of rules. One exemplary rule is that the second UIM is only required to be input if the transaction is for an amount above a second predetermined threshold. Thus, the holder of the first UIM may be authorised to carry out transactions up to the second predetermined threshold (of, say, £250) without requiring specific approval of the holder of the second UIM (i.e. the primary account holder). Similarly, the first UIM holder may be allowed to carry out a pre-set number of transactions over a given period (e.g. 20 transactions per week), or up to a pre-set total value of transactions over a given period (e.g. £400 per month), or any suitable combination of conditions and rules.

Another exemplary rule is that the second UIM must be input within a predetermined time period after the input of the first UIM or vice versa. Such a rule would ensure that transactions would not remain pending for prolonged periods of time after entry of either the first or second UIM, improving the efficiency of the process and mitigating against the risk of the holder of the second UIM inadvertently approving a transaction that they might otherwise not have approved.

The rules may be set by the primary account holder so as to specify the access limits of the holder of the first UIM to the account.

At least one of the steps of verifying the first and second UIMs may be executed at the payment device. Alternatively or additionally, at least one of the steps of verifying the first and second UIMs may be executed over the payment processing network. These alternatives take into account that the UIM verification steps may take place offline or, under certain circumstances, online. The verification of at least the first or second UIM may comprise comparing and matching the input UIM(s) to reference values and/or data stored in a secure element of the payment device. This would allow for the UIM verification steps to take place offline, within the payment device.

The method typically further comprises the preliminary steps of assigning the first UIM to a first party and assigning the second UIM to a second party. As alluded to above, the second party may be the primary account holder and can set the limits of access of the holder of the first UIM to that account. In this manner, a primary account user, such as a parent or a company director, may grant limited rights of access to a first party, such as a dependent child or an employee as the case may be. Because the first party does not know the second UIM, transactions outside the limits set by the second party can only proceed under the authority of the second party through their inputting of the second UIM.

The step of requesting input of a first UIM may include requesting a first biometric identification input and the step of verifying the first UIM input may include verifying the first biometric identification input.

The step of requesting input of a second UIM may include requesting a second biometric identification input and the step of verifying the second UIM may include verifying the second biometric identification input.

According to a second aspect of the invention, there is provided a payment device comprising a processor and a memory in communication with the processor and storing program instructions, wherein the processor is operative with the program instructions to perform the actions of: establishing a communication between the payment device and a payment processing network; initialising a transaction at the payment device; requesting input of a first UIM; requesting input of a second UIM; verifying the first UIM; verifying the second UIM; and communicating with the payment processing network to proceed with the transaction if both UIMs are successfully verified.

There exist a variety of suitable devices. Personal computers, laptops and tablets are a few examples which could have the necessary functionality.

The first UIM may be Personal Identification Number (PIN) and/or a predetermined biometric identification.

The second UIM may be Personal Identification Number (PIN) and/or a predetermined biometric identification.

The payment device may be a portable electronic device, further comprising a user interface and/or a means for measuring biometric characteristics, and wherein at least one of the first and second UIMs is input via the user interface and/or means for measuring biometric characteristics. One such device could be a mobile phone enabled with transaction capabilities (e.g. including an EMV™ chip or such functionality contained in a secure element such as a SIM card). Here, the UIM may be verified internally by the payment device. Such a verification may be done offline by matching the input UIM with data stored on the secure element or chip and/or a record of biometric data stored on the payment device and the payment device may subsequently generate a transaction token.

According to a third aspect of the invention, there is provided a transaction authorisation system comprising a payment processing network and a payment device according to the second aspect in communication with the payment processing network.

In the transaction authorisation system, the payment device may be an Integrated Circuit Card (ICC). In such a case, the transaction authorisation system may further comprise a terminal communicatively coupled with the payment processing network, wherein the ICC is insertable into the terminal in order to establish a communication between the ICC and the payment processing network. Such an arrangement is suited to transactions at a merchant equipped with a terminal connected to a payment processing network.

According to a fourth aspect of the invention, there is provided a processor-readable medium comprising a set of program instructions, wherein execution of the program instructions by a processor causes the processor to perform the actions of: establishing a communication between a payment device containing the processor and a payment processing network; initialising a transaction at the payment device; requesting input of a first UIM; requesting input of a second UIM; verifying the first UIM; verifying the second UIM; and communicating with the payment processing network to proceed with the transaction if both UIMs are verified. Such a set of instructions would enable the aforementioned secure delegation of account access by an account holder to a second party.

The first UIM may be a Personal Identification Number (PIN) and/or a predetermined biometric identification.

The second UIM may be a PIN and/or a predetermined biometric identification.

The set of program instructions may further include instructions that cause the processor to perform the actions of: establishing whether the transaction amount is below a first predetermined level; and, if so, bypassing the actions of requesting input of the first UIM and verifying the first UIM. Such instructions would allow the aforementioned first predetermined threshold to be set and implemented.

The set of program instructions may further include instructions that cause the processor to perform the actions of: establishing whether the transaction amount is below a second predetermined level; and, if so, bypassing the actions of requesting input of the second UIM and verifying the second UIM. Such instructions would allow the aforementioned second predetermined threshold to be set and implemented.

The set of program instructions may further include instructions that cause the processor to perform the action of establishing whether the second UIM has been input within a predetermined time period after the input of the first UIM. This would allow the setting and implementation of the predetermined time limit within which the second entry of a UIM must be made following a first entry.

Verifying at least the first or the second UIM may comprise comparing and matching the input UIM(s) to reference values and/or data stored in a secure element of the payment device. This allows for UIM verification to take place offline, within the payment device.

The possibility of having more than two UIMs is also envisaged which would enable further tiers of delegation.

DETAILED DESCRIPTION

At the centre of most modern day monetary transactions is what is known as a payment processing network. An example of such a network is the MasterCard™ operated Banknet™, one of the world's largest global telecommunications networks which links all MasterCard™ members and MasterCard™ data processing centres into a single financial network. Banknet™ facilitates the routing of transactions for authorization from almost anywhere in the world. Typically, payment networks such as Banknet™ comply with standards specifications which define the interchange message specifications for the exchange of electronic transactions made by cardholders using payment cards. ISO 8583—Financial transaction card originated messages—is one such standard.

Such payment networks form an integral part of what is commonly known as a "four-party" or "open loop" payment system because transfers via the system may occur between two financial institutions (serving respective customers) that do not have a contractual relationship with each other but rather are members of the system. The four parties are: an account holder or a representative of an account holder; a merchant; an issuing financial institution; and an acquiring financial institution.

The account holder is a customer of the issuing financial institution who is typically provided with a payment device by said financial institution, commonly in the form of an Integrated Circuit Card (ICC) such as a MasterCard™ payment card. The role of the payment device is to provide both the necessary information required for a transaction and the appropriate level of security. Verification of the payment device holder is used to evaluate whether the person presenting the payment device is the legitimate holder of said device.

The merchant is typically a seller of goods or services and is a customer of the acquiring financial institution. The payment network acts as a fifth party which links the four parties involved in each payment process, thereby facilitating the transaction.

Figure 1A:
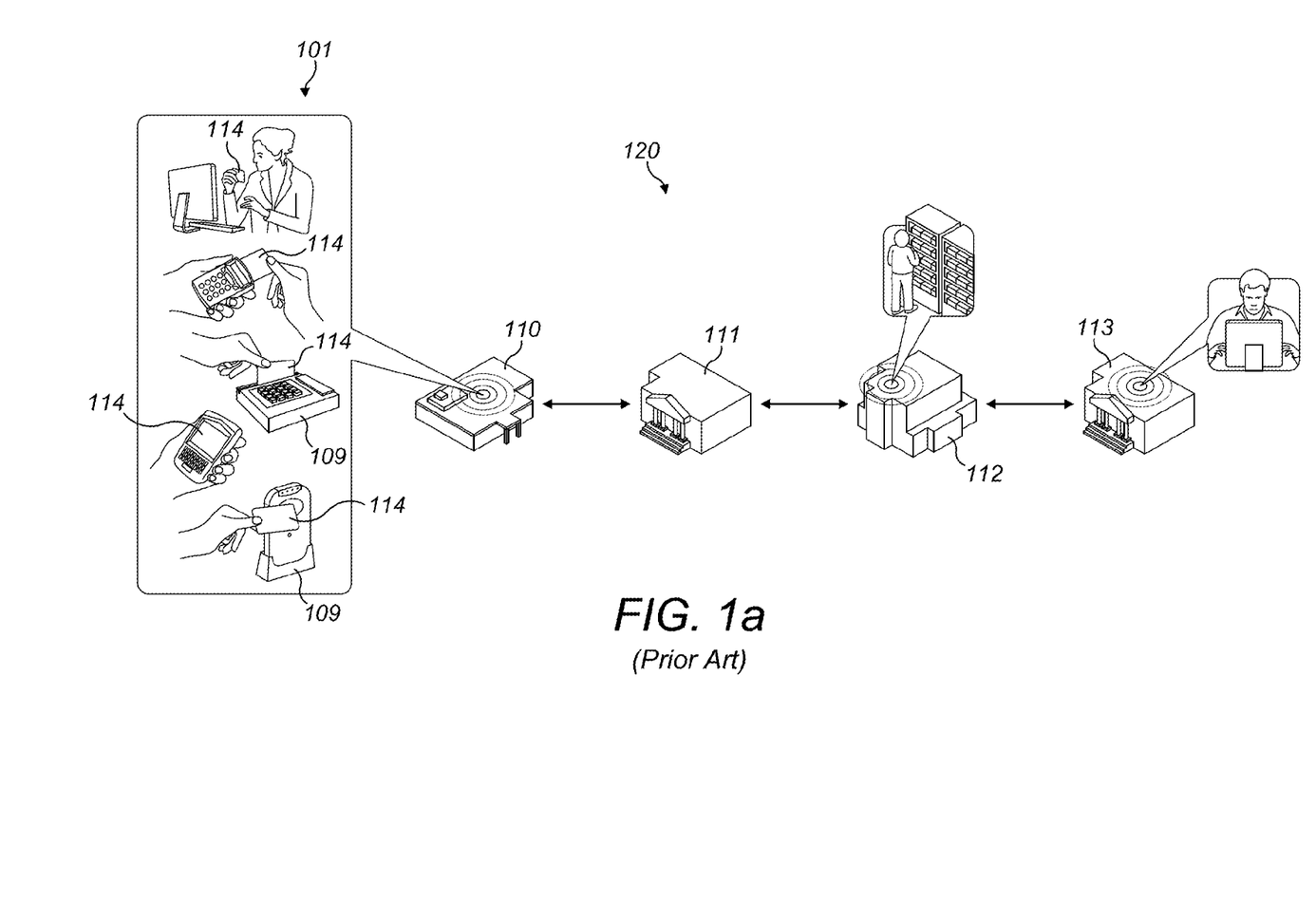
FIG. 1a is an operating model of a known four-party payment system which depicts the parties involved and their interactions with one another.
Figure 1B:
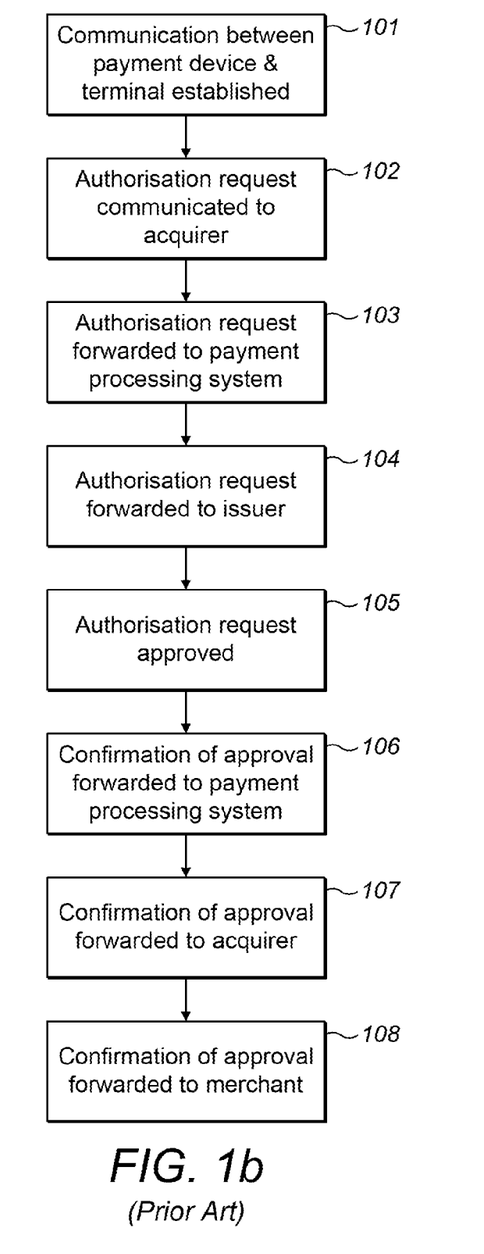
FIG. 1b is a flow diagram illustrating the processes which occur when a successful transaction is made across a known four-party payment system.

FIG. 1a depicts an operating model of the parties involved in a four party payment system and FIG. 1b depicts a flow diagram of the processes which occur therein. Together they represent a successful transaction made using a four-party payment system. The model includes a payment device 114 and a terminal 109 (sometimes referred to as a "Point of Sale" or POS terminal). The payment device 114 could be an Integrated Circuit Card, an electronic device or any device capable of storing, receiving and transmitting the information required during a transaction. The terminal 109 is typically possessed by a merchant 110. The merchant 110 has a contract with a financial institution to accept payments from payment devices such as payment device 114. That financial institution (i.e. the merchant's bank) is the acquirer 111. The issuer 113 is the financial institution that has issued the payment device 114 to a particular customer (i.e. the customer's bank). The acquirer 111 and the issuer 113 are linked by the payment processing system 112. Together, the merchant 110, the acquirer 111, the payment processing system 112, and the issuer 113 comprise a payment processing network 120.

In the exemplary operating model of FIG. 1, a payment device 114 is presented to a merchant 110 who possesses a terminal 109. The payment device 114 interacts with the terminal 109 and a communication is established (step 101). Once the connection between the terminal 109 and the payment device 114 is established, a transaction is initialised at the terminal 109. The terminal 109 then communicates an authorisation request to the acquirer 111 (step 102). The acquirer 111 forwards the request on to the payment processing system 112 (step 103), which determines which issuer 113 is associated with the payment device 114. The payment processing system 112 then forwards the authorisation request on to the issuer 113 for transaction approval (step 104). Here, the payment processing system 112 may validate the payment device's security features before forwarding the authorisation request 104. The issuer 113 then checks certain criteria, such as account status, and approves the authorisation request if those checks return satisfactory results (step 105). This approval is then forwarded on to the acquirer 111 via the payment processing system 112 (steps 106 and 107). The acquirer 111 sends the approval on to the merchant 110, which receives confirmation via the terminal 109 (step 108).

Many four-party payment systems adhere to the EMV™ standard, developed by Europay™ (which has subsequently merged with MasterCard™), MasterCard™ and Visa™. EMV™ provides open specifications for chip-based payment devices and terminals to facilitate global interoperability for transactions. Further, EMV™ is regularly upgraded and is regarded as the backbone for future payment technologies such as mobile payments.

The key element of EMV™ involves including dynamic digital data in every transaction. This makes these types of transactions extremely secure and reduces the risk of fraud. A consumer payment application is resident in a secure Integrated Circuit Card (ICC) or chip. This can be the contact chip in smart cards or the contactless chip in smart cards or personal devices such as smart phones. There are standards based on ISO/IEC 7816 for contact cards, and standards based on ISO/IEC 14443 for contactless cards/devices.

An EMV™ standard chip is able to perform processing and contains a secure element which stores information and performs cryptographic functions.

When an EMV™-enabled device is used to pay at an EMV™ terminal, it can be instantly identified as an authentic, approved payment instrument belonging to the holder of said device through a process called dynamic authentication. When used with a Personal Identification Number (PIN), the chip verifies that the consumer is indeed holding his or her own device, through recognising the correct PIN has been input. This implementation of EMV™ is commonly known as "Chip and PIN".

The transaction flow of EMV™ transactions is much the same as that of the four-party system described above, but with the addition of dynamic authentication and chip technology.

Figure 2:
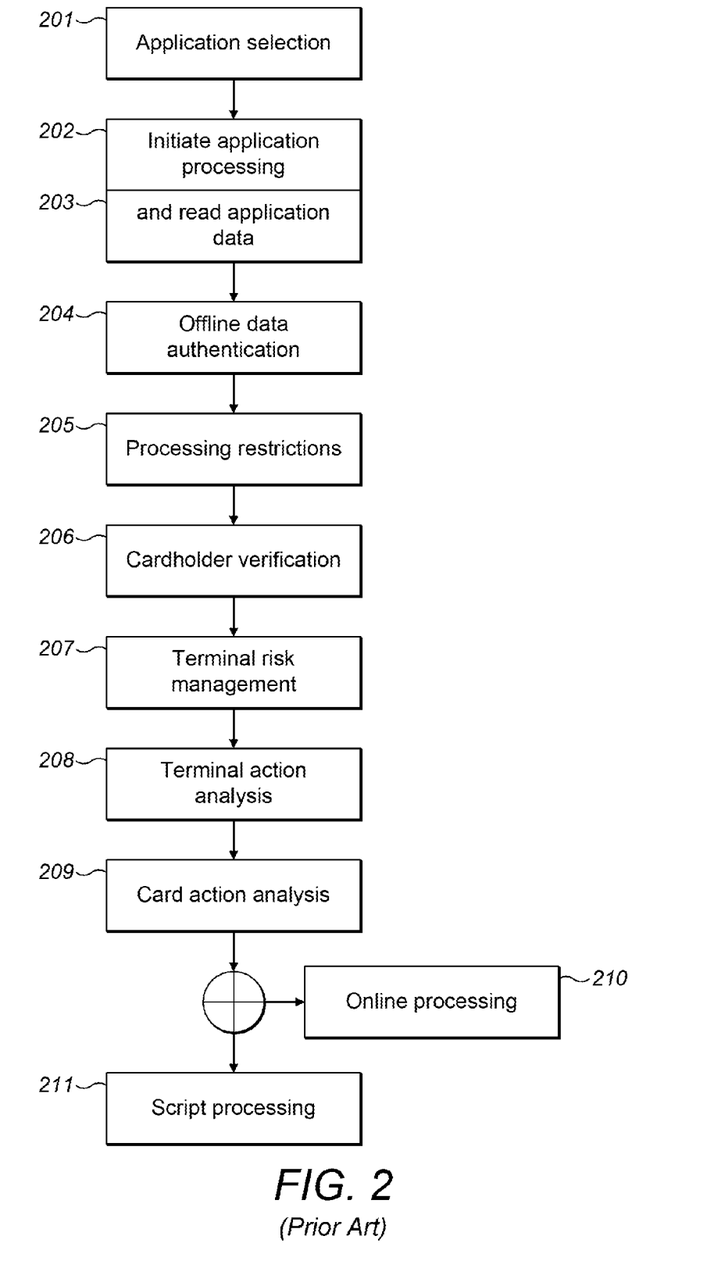
FIG. 2 is an exemplary flow diagram representing the stages in a known EMV™ transaction.

FIG. 2 shows an exemplary flow diagram representing an EMV™ transaction, the stages of which will now be discussed in detail.

The first stage, following the establishment of a communication between a payment device and a terminal, is Application Selection (step 201). Different service providers (MasterCard™, Visa™ etc.) use different applications in their chips to distinguish themselves. Furthermore, individual providers use different applications to distinguish their products (Mastercard™ credit or debit, Maestro™, Cirrus™ etc.). As such, some chips contain more than one application. Each application is issued with an associated application identifier (AID). During the application selection stage (201) the terminal and chip "agree" on their common applications and choose which application to use for the transaction. This choice may be made by the payment device holder where more than one application is supported.

The second stage is Initiate Application Processing (step 202). Here the terminal issues a "get processing" command to the chip whilst also providing it with any required data. The chip responds with a list of functions to be performed during the transaction process and a list of files which contain the required EMV™ data that the terminal needs to read from the chip. At the next stage, Read Application Data (step 203), the terminal reads these files and obtains the necessary data therein.

The next stage is Offline Data Authentication (step 204). Here, a cryptographic operation is performed to validate the chip. There are three possible methods which may be used. These are Static Data Authentication (SDA), Dynamic Data Authentication (DDA) and Combined Data Authentication (CDA). This step is not mandatory, only one method is chosen and a specific method may only be carried out where both the terminal and the chip support it.

The next stage is Processing Restrictions (step 205). Here, the data supplied to the terminal by the chip is checked. This data may include payment device expiry date and details on any usage controls. If these checks are successful, the terminal confirms that the chip is allowed to do the transaction requested.

The next stage is Cardholder Verification (step 206). This stage helps ensure that the person making the payment is the legitimate holder of the payment device. There are many Cardholder Verification Methods (CVMs) supported by EMV™ and these can include Signature, Offline plaintext PIN, Offline enciphered PIN, Offline plaintext PIN and signature, Offline enciphered PIN and signature Online PIN, or no CVM required. A method supported by the terminal and agreed to by the chip is used.

More recently, biometric forms of input have been used as a CVM with a view to increasing the security and making it more difficult to fake or forge the presence of the cardholder or their consent. Such biometric cardholder identification methods which include biometric fingerprinting, face and voice recognition are convenient and require little thought from the cardholder.

Collectively, PIN and biometric identification inputs can be referred to as User Identification Metrics (UIMs). Where a UIM is referred to throughout this specification, it will be understood that it can represent a PIN, biometric identification or both of these.

The next stage of the transaction process is Terminal Risk Management (step 207). The terminal checks the transaction amount against an offline ceiling limit to determine whether online processing is required. The results are used to determine whether a transaction should proceed online or offline. A decision is made during the Terminal Action Analysis stage (step 208) based on the results of steps 204, 205, 206, 207, any rules defined in the terminal (known as Terminal Action Codes) and any rules read from the chip (known as Issuer Action Codes). The terminal then sends data and requests a cryptogram, the type of cryptogram requested being dependent upon whether the decision to either approve or decline offline or go online for further authorisation has been made.

The next stage is Card Action Analysis (step 209). Here, the chip's response to the terminal's request is to provide either a Transaction Certificate (TC) for offline approval, an Application Authentication Cryptogram (AAC) for offline declining or an Authorisation Request Cryptogram (ARQC) for further online authorisation, all of which are commonly known as EMV™ application cryptograms. Application cryptograms are signatures, unique to the chip, composed of data elements that indicate the current status at the transaction point.

If an ARQC application cryptogram is requested, the transaction goes online. The ARQC is sent to the issuer, via a payment processing system 112 such as the payment processing system operated by MasterCard™, as part of an online request built by the terminal (step 210). The request is for authorisation and online card authentication. The issuer responds to the request with a response code accepting or declining the transaction, an Authorisation Response Cryptogram (ARPC) and optionally an issuer script, which is a string of commands to be sent to the card. Then a chip validation of the ARPC confirms the approval response from the issuer.

The final stage is Completion and Script Processing (step 211). Here, the transaction completes. If online processing occurred, the terminal will request the chip to confirm with a TC (approval) or an AAC (decline) and will apply any script commands from the issuer host.

It will be appreciated that such transactions may be performed as contactless transactions. Mastercard™ PayPass™ is an example of an established contactless payment system in the United Kingdom. Here, a PIN is only requested for transactions above £20. The payment device need not necessarily be a card. Devices such as mobile phones or other electronic devices enabled with the same features as an ICC may be used in EMV™ transactions.

Furthermore, a contactless interaction between the payment device and terminal may make use of NFC technology. The Mastercard™ PayPass™ application can be downloaded onto mobile phones with NFC capabilities. The user signs up for Mastercard™ PayPass™ with a participating financial institution—an issuer 113. Subsequently, the user downloads the card payment details onto their phone 114; a simple process which takes minutes. Then the user activates the Mastercard™ PayPass™ application. To make a payment, the user initialises the application, brings their phone 114 into the vicinity of a Mastercard™ PayPass™-enabled terminal 109 and waits for confirmation that the transaction has completed. Such a transaction may occur via the EMV™ transaction process of FIG. 2.

EMV™ transactions such as the exemplary transaction of FIG. 2 may make use of a PIN during the cardholder verification stage 206. A PIN is a confidential numeric password shared between a user and an authentication system. As a PIN associated with an account is made known only to the account holder, it may reliably be used to verify that a party attempting to make a transaction is the account holder. Mastercard™ PayPass™ transactions using NFC technology may require the input of a PIN. The PIN may, for example, be input via a keypad interface on a mobile phone.

It will also be appreciated that biometrics may be used as a means for cardholder verification, i.e., any system which makes use of the measurement of biometric characteristics for identity verification. Known transaction systems incorporate biometric input cardholder verification.

Some such systems include a biometric input terminal at the POS. Cardholder identification is established by the biometric input terminal detecting a biometric input of the cardholder. This may, for example, comprise a single, natural biometric input being detected.

For example, a user could register their fingerprint(s) on a central database, and subsequently present a single finger (typically, but not necessarily, the index finger, being the most natural) at the biometric input terminal at the POS for the fingerprint to be scanned and verified against that registered and stored on the central database so as to establish the presence of the cardholder at the POS. It is envisaged that more than one finger could be presented at the biometric input terminal.

Alternatively, voice recognition, facial recognition, vein pattern recognition, retinal scanning, or gait analysis may be used as a biometric input.

The present method relates to an authorisation system which enables a first person (the 'second party') to delegate access to an account whilst maintaining a desired level of control over any transaction made using that account. The second party may have total control over every transaction or may impose restrictions on certain types of transactions. The method, its advantages and some exemplary variations of the method are discussed below.

The transaction authorisation system for executing the method may operate as part of a four-party system, as described above. Equally, the transaction authorisation system may be part of a three or two-party payment system. The transaction authorisation system may be applied to any payment system where a payment device accesses a payment processing network directly of where an interaction between the payment device and a terminal occurs during a transaction process. The transaction authorisation system may adhere to the EMV™ standard.

Figure 3:
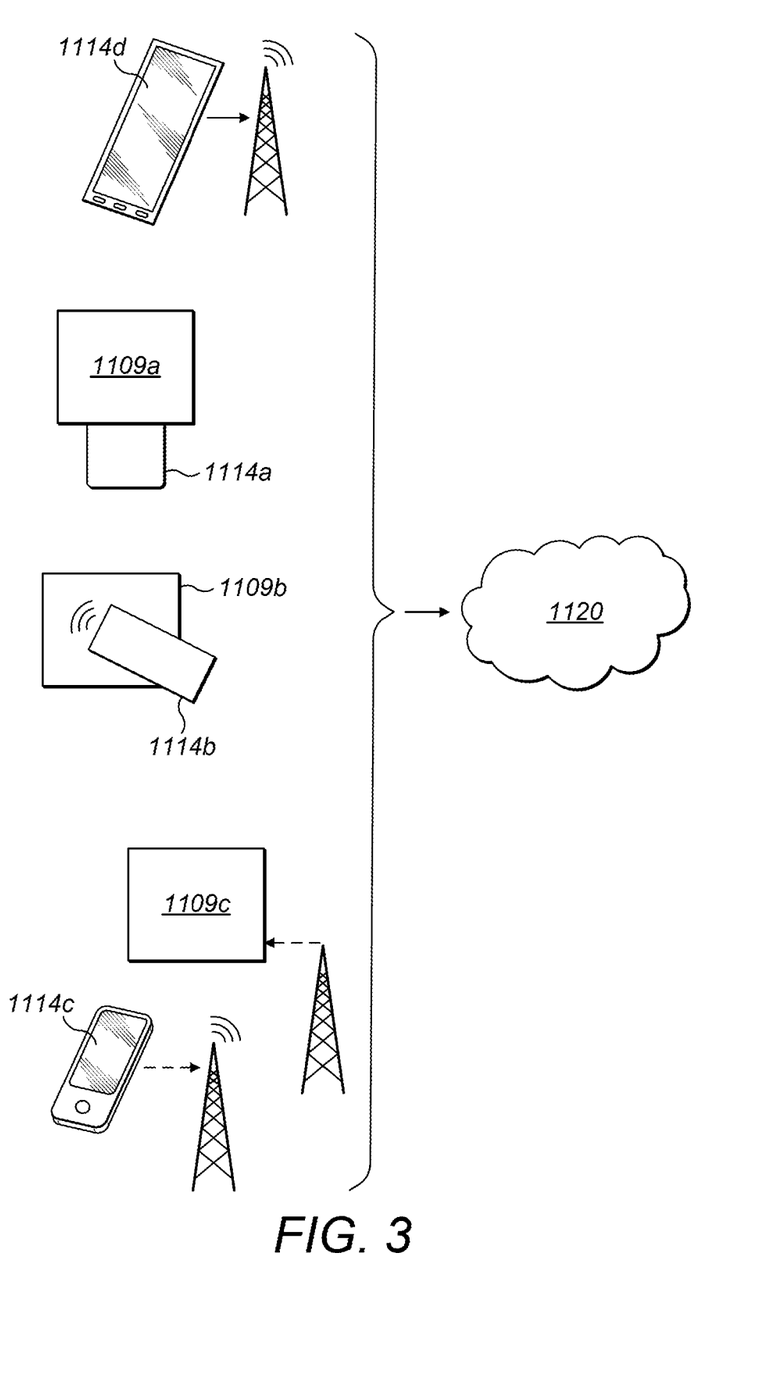
FIG. 3 shows alternative examples of payment devices and terminals, communicatively coupled with a payment processing network, in accordance with aspects of the invention.
Figure 4:
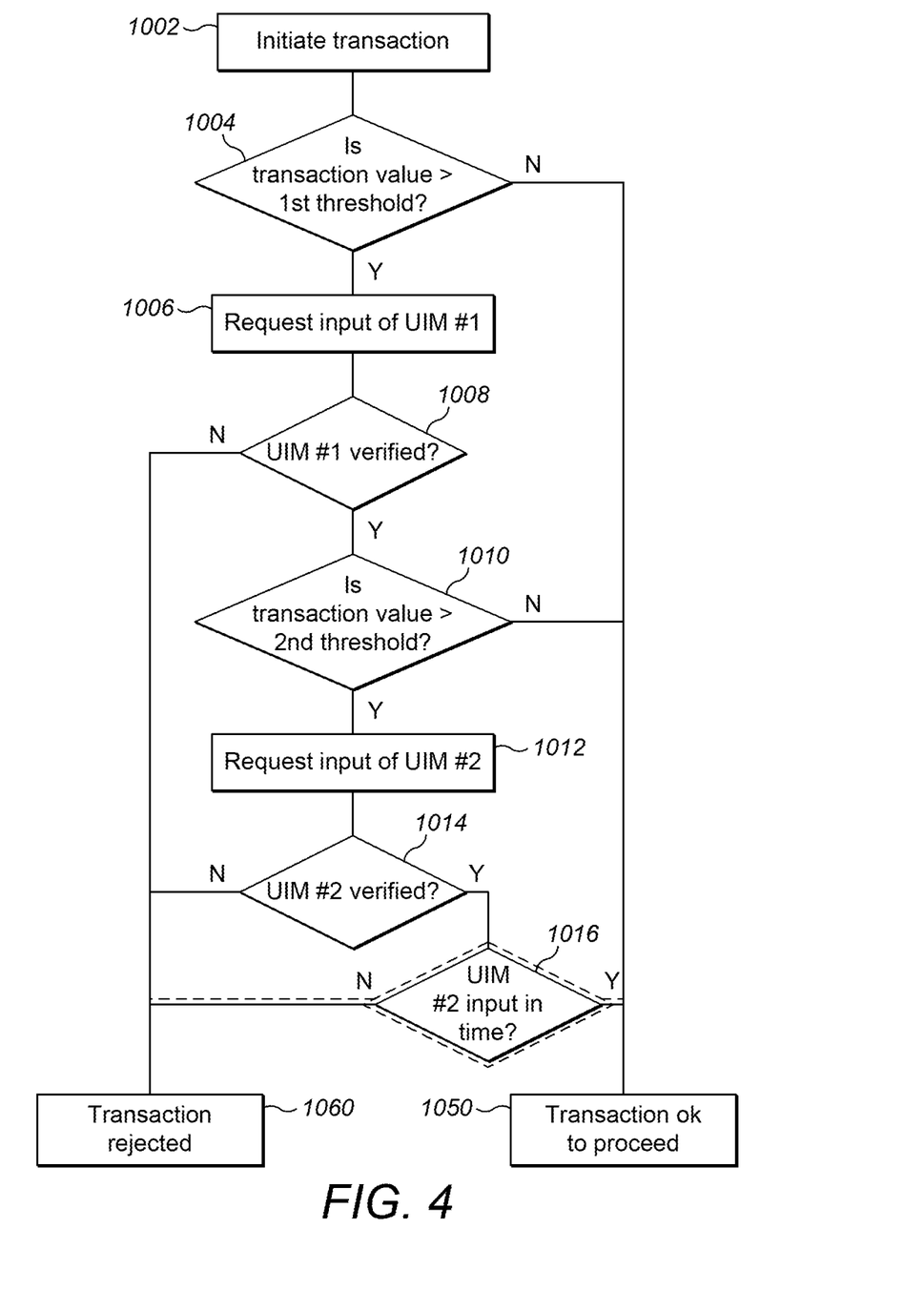
FIG. 4 is a flow diagram of the processes carried out in the method of the present invention.

With reference to FIGS. 3 and 4, in a first embodiment a first step in the method comprises initiating a transaction at a payment device 1114 communicatively coupled with a payment processing network 1120 (step 1002), for example by a first party (or merchant if present) inputting a transaction value at the payment device 1114. This may occur by selecting a product or a service to purchase on a retailer or supplier website, for example. At step 1004, it is determined whether the transaction value is above a predetermined first value. If it is above that first value, then the first party is requested at step 1006 to input their User Identification Metric (UIM, includes PIN and/or biometric identification), and the input first UIM is verified at step 1008. The first party may input their UIM at the payment device where the payment device comprises a means for entering a UIM.

The term communicatively coupled is intended to cover the scenario where the payment device 1114 is able to communicate with the payment processing network 1120, but is not necessarily in constant communication with the payment processing network 1120.

Where a PIN is entered at the payment device 1114, it may be verified internally by the payment device. Such a verification may be done offline by matching the input PIN with data stored on a secure element with the appropriate functionality comprising part of the payment device. The secure element could be a SIM card interacting with the payment device or a chip imbedded in the circuitry of the payment device. The payment device may be a mobile phone such as 1114*d*. For such devices no terminal is required (refer to embodiments having a terminal described below), as the steps normally carried out by the terminal may be carried out by the payment device.

Such a system provides increased security for the purchaser who is in possession of both the PIN and the point of PIN entry (the payment device). Furthermore, it allows for remote transactions, as described above, to take place without the need for a terminal. Verification may, of course, be carried out online via the payment processing network 1120, as described above.

Where a biometric identification is input at the payment device 1114, it may be verified by accessing a database which contains a register of cardholder biometric identification data. This database may be external to the payment device 1114 requiring the payment device 1114 to go online to verify the biometric identification, for example, by accessing the database via the payment processing network 1120. Alternatively, the database may be securely stored on the payment device 1114 and verification may be performed offline.

If, on the other hand, the transaction value is below that first value, there is no need to request the first UIM to be input and then verified, so the transaction can proceed without verification of the first party (step 1050).

If the first UIM is verified at step 1008, then the next step is to determine whether the transaction value is above a second predetermined threshold (step 1010).

If the transaction value is below that second value, the transaction value is within the limits set by the second party so there is no need to request the second UIM to be input and then verified; the transaction can proceed without verification of the second party (step 1050).

If, on the other hand, the transaction value is above that second value, then the second party is requested at step 1012 to input their UIM, and that input second UIM is verified at step 1014. This establishes that the second party authorises the first party to carry out the transaction, and the transaction can proceed (step 1050), both parties having been verified as approving the transaction through their input of the correct respective first and second UIMs.

Should the first UIM not be verified at step 1008 (i.e. it is input incorrectly), or should the second UIM, if required, not be verified at step 1014, then the transaction is rejected (step 1060).

Reaching step 1050 establishes the identities of the first and second parties and their approval of the transaction to continue. That does not necessarily mean that the transaction will be completed; that will depend on the usual payment processing steps, such as verifying the amount of funds available in the account, also being completed successfully. For example, following offline verification of the input UIMs, the payment device may be able to generate an ARQC token and transmit the token to the payment processing network 1120 for processing the transaction in the conventional manner.

Where verification steps 1008 and 1014 (if required) were performed offline, this may be the first point at which a communication between a payment device 1114 and a payment processing network 1120 is established.

Accordingly, the method may require that, in order for a transaction to be authorised, two UIMs must be provided. Although the focus of this application is on a two-UIM system, the method may equally require that more than two UIMs be provided.

Each UIM, where it is a PIN, may individually be known only to a single party and these parties may be different parties and, where it is a biometric identification, a UIM may only be those of a single party and these parties may be different parties. As such, it is made possible that, where two UIMs are requested, the independent verification of two parties is required before a transaction may proceed.

The above sequence of steps is merely exemplary, and, for example, the order of the steps of establishing whether the transaction value is above the first threshold and whether the transaction value is above the second threshold may be switched, with resultant changes to the order of the steps of requesting and verifying the first and second UIMs. Also, it is not necessary to verify the first UIM (step 1008) before proceeding to step 1010. Instead, both of the verification steps 1008 and 1014 may take place after the steps 1004 and 1010 of establishing whether the transaction value is above the first and second thresholds are complete.

The steps 1004 and 1010 are dependent on rules set on the relevant account, establishing the limits of the first party's access to and use of the account. The rules may be set by the second party, or may be set by the issuer, the acquirer or the payment processing system (or any combination of the above).

Further rules may be set too. As an example, the second UIM may have to be input within a predetermined period of time after the input of the first UIM, or vice versa. This is illustrated in FIG. 4 by the optional step 1016 of establishing whether the second UIM has been input within the requisite time frame, and passing the transaction to proceed if it was, or rejecting the transaction if it was not. An advantage of such a rule is that transactions would not remain pending for prolonged periods of time after entry of either the first or second UIM reducing the risk of fraud, ensuring both parties are physically present at the same time and improving the efficiency of the process. For example, by ensuring that the transaction being approved is 'fresh', the second party can be assured that they are approving the correct transaction. Also, a party could promptly be made aware of a rejection of a transaction under such circumstances.

The method of the first embodiment may require that both UIMs be entered at the same payment device 1008. Here, both parties must be physically present at the location of the payment device.

The method of the first embodiment may instead allow the second UIM to be entered remotely of the first payment device. In the situation where first and second UIMs are requested, the first party, having knowledge of only the first PIN and/or only being able to supply the first biometric identification, as appropriate, is able to input that first UIM at the payment device 1008, as has been described. A notification of the transaction initialisation is then sent to the second party. This may be via SMS, a web based notification, a smartphone application, or any device capable of receiving a notification of the transaction initialisation. The notification may indicate to the second party that a UIM is required if the transaction is to continue. The second party may then enter the second PIN known to them and/or biometric identification which they are able to supply remotely, as appropriate. Where at least part if the UIM is a PIN could be transmitted via return SMS, a web based user interface or a smartphone user interface. The second PIN may be sent using the electronic device with which the notification was received. Where at least part if the UIM is a biometric identification, this could also be input and returned remotely, for example, a remote biometric input terminal could be used by the second party. The biometric identification input could be returned by the remote biometric input terminal via any suitable, for example, via a telecommunications network. Upon receipt of the second UIM, the verification stage of the transaction is completed and the transaction process is allowed to proceed.

It will be appreciated that biometric identification includes any use of the measurement of biometric characteristics for identity verification.

In a second embodiment, a first step in the method comprises establishing a communication between a payment device 1114 and a terminal 1109 communicatively coupled with a payment processing network 1120. The communication between the payment device 1114 and the terminal 1109 may be established via a direct physical connection, for example in the case of the payment device 1114a including a contact chip, and the terminal 1109a having contacts configured to read the contact chip. Alternatively, the communication may be via contactless connection, such as short range communication protocol such as NFC in the case of the payment device 1114b including a contactless chip with a suitably-equipped terminal 1109b, or via a mobile phone network in the case of the payment device being a suitably-enabled mobile phone 1114c with an associated terminal 1109c.

In the second embodiment, whichever means of communication is used, a transaction is initiated at the terminal 1109, (step 1002), for example by a merchant inputting a transaction value at the terminal 1109 upon request by a first party. This embodiment subsequently proceeds following all of the same steps as the first embodiment, starting with step 1004. Although UIM verification (steps 1008 and 1014) may happen as outlined above, the terminal 1109 may also perform these steps. Here verification may comprise established EMV™ standard verification processes.

It will also be appreciated that terminal 1109 may further comprise a keypad for inputting PINs and/or a biometric input terminal.

The method of the second embodiment may require that both UIMs be entered at the same terminal. Here, both parties must be present at the location of the terminal. It is noted that the UIMs need not be entered via the terminal. For example, the payment device 1008 may comprise a means for entering a UIM which could then be transmitted to the terminal for verification. This would be particularly applicable for contactless transactions where the payment device need only be situated near the terminal, as described above by reference to FIG. 3.

The method of the second embodiment may allow one UIM to be entered remotely of the terminal. Here, remotely is intended to mean at another location and is intended to be distinguished from difference in location between payment device 1008b and terminal 1009b in a contactless transaction. Here, when a first party presents a payment device at a terminal and a transaction is initialised, first and second UIMs are requested. The first party, having knowledge of only the first UIM, is able to input that first UIM at the terminal 1009, either directly into the terminal or via the payment device 1008 as has been described. A notification of the transaction initialisation is then sent to the second party. This may be via SMS, a web based notification, a smartphone application, or any device capable of receiving a notification of the transaction initialisation. The notification may indicate to the second party that a UIM is required if the transaction is to continue. The second party may then enter the second UIM which may be a PIN known to them and/or biometric identification which they are able to supply remotely, as appropriate. Where at least part of the UIM is a PIN, this could be returned via return SMS, a web based user interface, a smartphone user interface, e-mail or, in the case where at least part of the UIM is a biometric identification input, this could be input at a remote biometric input terminal. The biometric identification input could be returned by the remote biometric input terminal via any suitable, for example, via a telecommunications network. The second UIM may also be sent using the electronic device with which the notification was received. Upon receipt of the second UIM, the verification stage of the transaction is completed and the transaction process is allowed to proceed.

For at least one embodiment, it will be appreciated that the order with which the UIMs are both requested and input need not necessarily be that which is described above. The remote UIM may be entered prior to or simultaneously with the local UIM.

For at least one embodiment, it will also be appreciated that both UIMs may be input remotely. This would be appropriate when verifying online transactions.

For at least one embodiment, it will also be appreciated that both parties may be issued with a payment device 1008 and both parties may be able to transmit their respective UIMs remotely via said payment device, should said device have the appropriate capabilities (internet connection, interface etc. . . . ). It will also be appreciated payment device 1008 may further comprise biometric input terminal.

For at least one embodiment, the method may allow for the second UIM to be a master UIM known only to and/or only able to be supplied by the primary account holder (second party). That is to say that input of the second UIM alone is sufficient to authorise any transaction to proceed. Thus, the primary account holder can use their account unfettered in the usual manner.

The rules for determining rights of access of the first party to the second party's account may be stored on the payment device 1114, on the terminal 1109 (in the second embodiment), or on a server in the payment processing network 1120—at the issuer 113, the acquirer 111, or the payment processing system 112 as the case may be.

It will be understood that, in relation to all embodiments, the above discussed input and verification of a first UIM may only require one of a first PIN or a first biometric identification or it may be that both are required.

It will be understood that, in relation to all embodiments, the above discussed input and verification of a second UIM may only require one of a second PIN or a second biometric identification or it may be that both are required.

It will be understood that the herein described embodiments can be adapted for use in fields beyond transaction processing. For example, it is envisaged that the herein described method could be used the field of healthcare, where a doctor is associated with one UIM and the patient with another, both UIMs being required, for example, to release information about the patient to a third party.

The flow charts and descriptions thereof herein should not be understood to prescribe a fixed order of performing the method steps described therein. Rather, the method steps may be performed in any order that is practicable. In particular, the step of establishing a communication between a payment device and a payment processing network may take place after the steps of verifying the first and second UIMs, as might occur in an offline transaction process. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

The invention claimed is:

1. A method of authorising a transaction process, said method comprising the steps of:
    establishing a communication between a payment device and a payment processing network;
    initialising a transaction at the payment device, wherein the transaction is initialised by a first user associated with a first User Identification Metric (UIM);
    applying a first set of rules;
    requesting input of the first UIM based upon the application of the first set of rules to an amount of the initialised transaction;
    applying a second set of rules;
    requesting input of a second UIM associated with a second user based upon the application of the second set of rules to the amount of the initialised transaction;
    verifying the first UIM;
    verifying the second UIM; and
    proceeding with the transaction process if both UIMs are verified.

2. The method of claim 1, wherein the first UIM is Personal Identification Number (PIN) and/or a predetermined biometric identification.

3. The method of claim 1, wherein the second UIM is a PIN and/or a predetermined biometric identification.

4. The method of claim 1, wherein at least one of the first and second UIMs is input directly to the payment device.

5. The method of claim 1, wherein at least one of the first and second UIMs is input remotely of the payment device and communicated to the payment device.

6. The method of claim 1, wherein the first set of rules includes a rule specifying that the input of the first UIM is not required if the transaction amount is below a first predetermined threshold amount.

7. The method of claim 1, wherein the second set of rules includes a rule specifying that the input of the second UIM is not required if the transaction amount is below a second predetermined threshold amount.

8. The method of claim 1, wherein the set of rules includes a rule specifying that the input of the second UIM must be within a predetermined time period after the input of the first UIM.

9. The method of claim 1, wherein at least one of the steps of verifying the first and second UIMs is executed at the payment device.

10. The method of claim 1, wherein at least one of the steps of verifying the first and second UIMs is executed over the payment processing network.

11. The method of claim 1, wherein verifying at least the first or the second UIM comprises comparing and matching the input UIM(s) to reference values and/or data stored in a secure element of the payment device.

12. The method of claim 1, further comprising the preliminary steps of assigning the first UIM to a first party and assigning the second UIM to a second party.

13. The method of claim 1, wherein the step of requesting input of a first UIM includes requesting a first biometric identification input and, wherein the step of verifying the first UIM input includes verifying the first biometric identification input.

14. The method of claim 1, wherein the step of requesting input of a second UIM includes requesting a second biometric identification input and, wherein the step of verifying the second UIM includes verifying the second biometric identification input.

15. A payment device comprising:
    a processor; and
    a memory in communication with the processor and storing program instructions;
    wherein the processor is operative with the program instructions to perform the actions of:
        establishing a communication between the payment device and a payment processing network;
        initialising a transaction at the payment device, wherein the transaction is initialised by a first user associated with a first User Identification Metric (UIM);

applying a first set of rules;
requesting input of the first UIM based upon the application of the first set of rules to an amount of the initialised transaction;
applying a second set of rules;
requesting input of a second UIM associated with a second user based upon the application of the second set of rules to the amount of the initialised transaction;
verifying the first UIM;
verifying the second UIM; and
communicating with the payment processing network to proceed with the transaction if both UIMs are successfully verified.

16. The payment device of claim 15, wherein the first UIM is a Personal Identification Number (PIN) and/or a predetermined biometric identification.

17. The payment device of claim 15, wherein the second UIM is a PIN and/or a predetermined biometric identification.

18. The payment device of claim 15, wherein the payment device is a portable electronic device, further comprising a user interface, and wherein at least one of the first and second UIMs is input via the user interface.

19. A transaction authorisation system comprising:
a payment processing network; and
a payment device according to claim 17 in communication with the payment processing network.

20. The transaction authorisation system of claim 19, wherein the payment device is an Integrated Circuit Card (ICC).

21. The transaction authorisation system of claim 20, further comprising a terminal communicatively coupled with the payment processing network, wherein the ICC is insertable into the terminal in order to establish a communication between the ICC and the payment processing network.

22. A processor-readable medium comprising a set of program instructions, wherein execution of the program instructions by a processor causes the processor to perform the actions of:
establishing a communication between a payment device containing the processor and a payment processing network;
initialising a transaction at the payment device, wherein the transaction is initialised by a first user associated with a first User Identification Metric (UIM);
applying a first set of rules;
requesting input of the first UIM based upon the application of the first set of rules to an amount of the initialised transaction;
applying a second set of rules;
requesting input of a second UIM associated with a second user based upon the application of the second set of rules to the amount of the initialised transaction;
verifying the first UIM;
verifying the second UIM; and
communicating with the payment processing network to proceed with the transaction if both UIMs are verified.

23. The processor-readable medium of claim 22, wherein the first UIM is a Personal Identification Number (PIN) and/or a predetermined biometric identification.

24. The processor-readable medium of claim 22, wherein the second UIM is a PIN and/or a predetermined biometric identification.

25. The processor-readable medium of claim 22, wherein the set of program instructions further includes instructions that cause the processor to perform the actions of:
establishing whether the transaction amount is below a first predetermined level; and, if so,
bypassing the actions of requesting input of the first UIM and verifying the first UIM.

26. The processor-readable medium of claim 22, wherein the set of program instructions further includes instructions that cause the processor to perform the actions of:
establishing whether the transaction amount is below a second predetermined level; and, if so,
bypassing the actions of requesting input of the second UIM and verifying the second UIM.

27. The processor-readable medium of claim 22, wherein the set of program instructions further includes instructions that cause the processor to perform the action of establishing whether the second UIM has been input within a predetermined time period after the input of the first UIM.

28. The processor-readable medium of claim 22, wherein verifying at least the first or the second UIM comprises comparing and matching the input UIM(s) to reference values and or data stored in a secure element of the payment device.

* * * * *